US011836337B1

(12) United States Patent
Agrawal et al.

(10) Patent No.: US 11,836,337 B1
(45) Date of Patent: Dec. 5, 2023

(54) AUTOMATED STATIC OR DYNAMIC FORMAT SELECTION OF SCREEN SHOT CAPTURE RESPONSIVE TO SIZE OF A DISPLAY

(71) Applicant: MOTOROLA MOBILITY LLC, Wilmington, DE (US)

(72) Inventors: Amit Kumar Agrawal, Bangalore (IN); Meng-Ru Yu, Taipei (TW); Mahadevan Ayalur, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/150,823

(22) Filed: Jan. 6, 2023

(51) Int. Cl.
*G06F 3/04845* (2022.01)
*G06F 3/0483* (2013.01)
*G06F 9/451* (2018.01)
*G06F 3/14* (2006.01)
*G06F 3/04842* (2022.01)

(52) U.S. Cl.
CPC ........ *G06F 3/04845* (2013.01); *G06F 3/0483* (2013.01); *G06F 3/04842* (2013.01); *G06F 3/1446* (2013.01); *G06F 9/451* (2018.02)

(58) Field of Classification Search
CPC .............. G06F 3/04845; G06F 3/0483; G06F 3/04842; G06F 3/1446
See application file for complete search history.

(56) References Cited

U.S. PATENT DOCUMENTS

| | | | | |
|---|---|---|---|---|
| 10,404,923 B1* | 9/2019 | Pena | ..................... | H04N 5/2621 |
| 11,507,266 B1* | 11/2022 | Agrawal | ............. | G06F 3/04847 |
| 11,720,696 B2* | 8/2023 | Agrawal | ................ | G06F 21/62 726/19 |
| 2004/0130564 A1* | 7/2004 | Smith | ..................... | G06F 9/451 715/705 |
| 2005/0275667 A1* | 12/2005 | Jeon | ...................... | G06F 3/1423 345/686 |
| 2008/0282160 A1* | 11/2008 | Tonnison | ................ | G06F 9/451 715/785 |
| 2011/0047488 A1* | 2/2011 | Butin | .................. | G06F 3/04842 715/762 |
| 2011/0221766 A1* | 9/2011 | Ko | .......................... | G06T 11/60 715/785 |
| 2011/0264709 A1* | 10/2011 | Beardsmore | ............ | G06F 9/451 707/804 |

(Continued)

*Primary Examiner* — Ariel A Balaoing
(74) *Attorney, Agent, or Firm* — Isidore PLLC

(57) ABSTRACT

An electronic device, method, and computer program product provide automated static or dynamic format selection of screen shot capture responsive to display size. An application, executed by a processor of the electronic device, presents, via a display, at least a portion of an electronic page. In response to receiving an input, via at least one input device of the electronic device, to capture a screen shot of the display, a controller of the electronic device determines a number of screens required to present an entirety of the electronic page. In response to the number of screens being equal to or less than a first threshold number of screens, the controller generates a static screen shot image of the electronic page. In response to the number of screens being greater, the controller generates a dynamic screen shot image that automatically scrolls or page flips through the entirety of the electronic page.

20 Claims, 12 Drawing Sheets

(56) References Cited

U.S. PATENT DOCUMENTS

| | | | | |
|---|---|---|---|---|
| 2013/0083079 A1* | 4/2013 | Paushkina | ........... | G06F 3/04883 |
| | | | | 345/668 |
| 2016/0283083 A1* | 9/2016 | Fu | ........................... | G06F 9/451 |
| 2018/0225261 A1* | 8/2018 | Lee | ..................... | G06F 3/04845 |
| 2019/0377989 A1* | 12/2019 | Dizengof | ................ | G06F 9/448 |
| 2022/0206645 A1* | 6/2022 | Zadina | ............... | H04N 21/4316 |
| 2023/0115555 A1* | 4/2023 | Agrawal | ............... | G06T 7/0002 |
| | | | | 715/708 |

* cited by examiner

US 11,836,337 B1

AUTOMATED STATIC OR DYNAMIC FORMAT SELECTION OF SCREEN SHOT CAPTURE RESPONSIVE TO SIZE OF A DISPLAY

CROSS REFERENCE TO RELATED APPLICATIONS

The present application is related to commonly owned U.S. patent application filed on even date herewith to the same named inventors and entitled "Automated Dynamic Format of Screenshot Capture Responsive to Display Size and Information Density", the disclosure of which is hereby incorporated by reference in its entirety.

BACKGROUND

1. Technical Field

The present disclosure relates generally to electronic devices that have a display, and in particular to electronic devices that support capturing a screen shot of image content presented by the display.

2. Description of the Related Art

Mobile electronic devices such as smartphones are used ubiquitously for many functions. In an example, users of mobile electronic devices select and view visual content such as images and alphanumeric text. Users of mobile electronic devices may choose to capture a screen shot of the display for storing or sharing. The screen shot is a static image of what is currently being presented. An electronic page presenting the visual content may have an information density that cannot be legibly reduced to fit entirely on a display of the mobile electronic device. To read an entirety of a long and/or wide electronic page having greater viewable dimension that the display screen, a user can pan, scroll, or page flip at an appropriate pace for reading comprehension through one or more screens presented on the display of the electronic device.

To save or share the large electronic page, a user may zoom down the presentation sufficiently that a single static image generated by the screen shot encompasses the entirety. For devices with small displays, the resolution of the reduced-sized image may be insufficient for generating a legible representation of the electronic page. Alternatively, the user may create a video recording of the display as the user controls the panning, scrolling or page flipping to view the entirety of a large electronic page. Audio that is being played by the mobile electronic device or that is being detected by microphones of the mobile electronic device is captured, increasing the size of the video recording file. Some mobile devices may lack the processing or storage capacity to make video recordings. Even if the device is capable, the size of the video recordings tends to be much larger than that of static images. The large size can create limitations on data storage or data throughput availability for storing or sharing the recording. In addition, the user may find the process of controlling a user interface of the mobile electronic device to create the video recording to be inconvenient or difficult.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
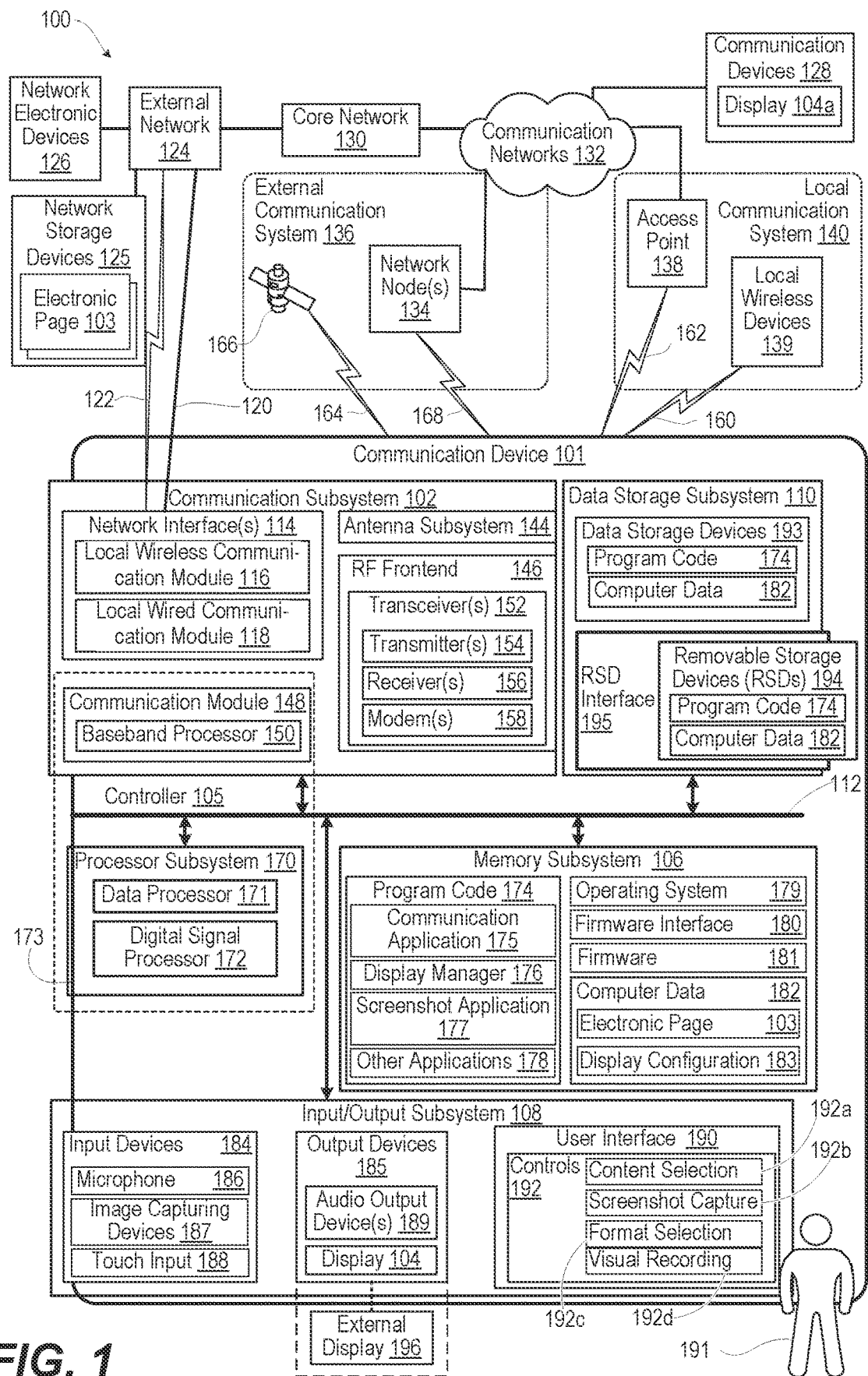
FIG. 1 depicts a functional block diagram of a communication environment including a communication device that automatically selects a format for screen shot capture that is responsive to a size of a display and to information density, according to one or more embodiments.

According to a first aspect of the present disclosure, an electronic device, a method and a computer program product provide automated static or dynamic format selection of screen shot capture, responsive to size of a display. The electronic device includes a display, at least one input device, and a memory storing an application that provides an electronic page of visual content. A controller of the electronic device is communicatively connected to the display, the at least one input device, the memory, and the communication subsystem. The controller executes the application to present, via the display, at least a portion of the electronic page. In response to receiving an input, via the at least one input device, to capture a screen shot of the display, the controller determines a number of screens required to present an entirety of the electronic page via the display. In response to the number of screens being equal to or less than a first threshold number of screens, the controller generates a static screen shot image of the electronic page. In response to the number of screens being greater than the first threshold number of screens, the controller generates a dynamic screen shot image that automatically scrolls or page flips through the entirety of the electronic page.

According to a second aspect of the present disclosure, a network device, a method and a computer program product provide automated dynamic format of screen shot capture, based on display size and information density. The second aspect occurs after determining that a medium or long screen shot format is appropriate during the first aspect. The second aspect may provide additional functionality and options for generating a dynamic screen shot image such as visual-only video recording. An electronic device includes a display and at least one input device. The electronic device includes a memory storing an application that provides visual content. The electronic device includes a display manager that manages rendering of visual content for presentation by the display. A controller of the electronic device is communicatively connected to the at least one input device, the memory and the display manager. The controller executes the application to provide an electronic page of visual content. The controller renders, via the display manager, the electronic page into a plurality of screens of visual content. The controller communicates one screen of the plurality of screens to the display manager for presentation on the display. In response to receiving a screen shot capture command from at least one input device, to capture a screen shot of the display, the controller determines a number of screens required to sequentially present an entirety of the electronic page being partially presented via the display. The controller determines an amount of readable information contained in the number of screens of the electronic page. The controller determines at least one transition rate required to legibly present each portion of the readable information presented in each screen in transitioning between two of the plurality of screens. The controller generates a dynamic screen shot image comprising at least two partial images with automated transitions at the at least one transition rate for each corresponding transition between the images.

The present disclosure provides advanced screen shot tools suitable for use on electronic devices having a small display and screen shot capturing capability. The screen shot tools automate selection and formatting functionality to be convenient and effective. In one or more embodiments, the present disclosure provides for determining that screen shot capture has been invoked in an electronic device. In response, a controller of the electronic device determines the amount of content as well as type of the content that is being captured as part of a screen shot. The controller queries a display manager of the electronic device to determine the type as well as the length of the content being rendered on a display of the electronic device. The controller may use artificial intelligence (AI) based image analysis techniques to categorize the screen shot to indicate appropriate formatting options. In an example, the categories can be: (i) a small-sized screen shot of less than two (2) pages; (ii) a medium screen shot of two (2) to four (4) pages of nominal information density or up to three (3) pages of dense information density; and (iii) a large screen shot that has more pages than a medium screen shot. In one or more embodiments, small screen shots are saved as a raster image file, such as Portable Network Graphic (PNG). Medium screen shots are saved as an animated sequence of bit map images such as Graphics Interchange Format (GIF) generated using multiple screen shots sequenced with a customized delay based on the content density. The customized delay is a transition delay time that is selected to provide sufficient time for an expected user to read the content of the medium screen shot. The controller may provide an option to a user to either use animated GIF or use audio-less screen record function to capture the content of a medium screen shot for optimal consumption. Large screen shots may also be captured as a dynamic screen shot image or a visual-only video recording.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of communication environment 100 that includes an electronic device in which the features of the present disclosure are advantageously implemented. In particular, communication device 101 is an example of the electronic device that automatically selects a format for screen shot capture of electronic page 103 based on a size of display 104, which partially presents electronic page 103. In addition, communication device 101 selects the format for screen shot capture that is in part based on information density of electronic page 103. Communication device 101 can be one of a host of different types of devices, including but not limited to, a mobile cellular phone, satellite phone, or smart phone, a laptop, a netbook, an ultrabook, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. Communication device 101 includes communication subsystem 102, controller 105, memory subsystem 106, input/output (I/O) subsystem 108, and data storage subsystem 110 that are each managed by controller 105. System interlink 112 communicatively connects controller 105 with communications subsystem 106, memory subsystem 106, input/output subsystem 108, and data storage subsystem 110. System interlink 112 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 112 are illustrated in FIG. 1, it is to be understood that more, fewer, or different interconnections may be present in other embodiments.

In one or more embodiments, communications subsystem 102 may include one or more network interfaces 114 such as local wireless communication module 116 and local wired communication module 118 to communicatively couple via network cable 120 or wireless connection 122 to external networks 124. Communication device 101, via external networks 124, may connect to network storage devices 125 that store electronic pages 103 and to network devices 126 such as network servers that facilitate access to network storage device 125. Communication device 101 may communicate with second communication devices 128 via external network 124 or via communication networks 132 that are supported by core networks 130. Network interface(s) 114 may include a network interface controller (NIC) and support one or more network communication protocols. External network 124 can be a local area network (LAN), a campus area network (CAN), a metropolitan area network (MAN), or a wide area network (WAN). For example, network cable 120 and wireless connection 122 can be an Ethernet connection/cable.

In one or more embodiments, communications subsystem 106 may include additional functionality for communicating, using a cellular connection, with network node(s) 134 of external communication system 136 and for communicating, using a wireless connection, with wireless access point 138 or local wireless devices 139 of local communication system 140.

Communications subsystem 106 includes antenna subsystem 144. Communications subsystem 106 includes radio frequency (RF) front end 146 and communication module 148 having baseband processor 150. RF front end 146 includes transceiver(s) 152, which includes transmitter(s) 154 and receiver(s) 156. RF front end 146 further includes modem(s) 158. Baseband processor 150 of communication module 148 communicates with controller 105 and RF front end 146. Baseband processor 150 operates in a baseband frequency range to encode data for transmission and decode received data, according to a communication protocol. Modem(s) 158 modulates baseband encoded data from communication module 148 onto a carrier signal to provide a transmit signal that is amplified by transmitter(s) 154. Modem(s) 158 demodulates each signal received using antenna subsystem 144 from external communication system 136 or local communication system 140. The received signal is amplified and filtered by receiver(s) 156, which demodulates received encoded data from a received carrier signal.

In one or more embodiments, controller 105, via communications subsystem 106, performs multiple types of cellular over-the-air (OTA) or wireless communication with local communication system 140. Communications subsystem 106 can communicate via an OTA connection 160 with local wireless devices 139. In an example, OTA connection 160 is a Bluetooth connection, or other personal access network (PAN) connection. In one or more embodiments, communications subsystem 106 communicates with one or more locally networked devices via a wireless local area network (WLAN) link 162 supported by access point 138. In one or more embodiments, access point 138 supports communication using one or more IEEE 802.11 WLAN protocols. Access point 138 is connected to communication networks 132 via a cellular or wired connection. In one or more embodiments, communications subsystem 106 receives downlink channels 164 from GPS satellites 166 to obtain geospatial location information. Communications subsystem 106 can communicate via an over-the-air (OTA) cellular connection 168 with network node(s) 134.

Controller 105 includes processor subsystem 170, which includes one or more central processing units (CPUs), depicted as data processor 171. Processor subsystem 170 can include one or more digital signal processors 172 that can be integrated with data processor 171. Processor subsystem 170 can include other processors that are communicatively coupled to data processor 171, such as baseband processors 150 of communication module 148. In one or embodiments that are not depicted, controller 105 can further include distributed processing and control components that are external to housing 173 or grouped with other components, such as I/O subsystem 108. Data processor 171 is communicatively coupled, via system interlink 112, to memory subsystem 106. In one or more embodiments, data processor 171 is communicatively coupled via system interlink 112 to communication subsystem 106, I/O subsystem 108, and data storage subsystem 110. Controller 105 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 106 stores program code 174 for execution by processor subsystem 170 to provide the functionality described herein. Program code 174 includes applications such as communication application 175, display manager 176, screen shot application 177, and other applications 178. In one or more embodiments, several of the described aspects of the present disclosure are provided via executable program code of applications executed by controller 105. In one or more embodiments, program code 174 may be integrated into a distinct chipset or hardware module as firmware that operates separately from executable program code. Portions of program code 174 may be incorporated into different hardware components that operate in a distributed or collaborative manner. Implementation of program code 174 may use any known mechanism or process for doing so using integrated hardware and/or software, as known by those skilled in the art. Memory subsystem 106 further includes operating system (OS) 179, firmware interface 180, such as basic input/output system (BIOS) or Uniform Extensible Firmware Interface (UEFI), and firmware 181. Memory subsystem 106 includes computer data 182 such as electronic page 103 selected for presentation on display 104 by communication application 175. Memory subsystem 106 includes computer data 182 such as display configuration 183 used by display manager 176 to appropriately render electronic page 103 for presenting on display 104.

I/O subsystem 108 includes input devices 184 and output devices 185. Input devices 184 may include microphone 186, image capturing devices 187, and touch input devices 188. Output devices 185 may include audio output devices 189 and display 104 that presents at least a portion of electronic page 103. Using capabilities of input devices 184 and output devices 185, user interface 190 is provided for user 191 to interact with communication application 175 and screen shot application 177. In an example, user interface 190 includes controls 192 that may be visually presented on display 104. Verbal, touch, or gesture command inputs are recognized by user interface 190 as corresponding to and activating controls 192. In an example, controls 192 may include content selection controls 192a to pick electronic page 103 and to pan, scroll, or page flip through portions of electronic page 103. Controls 192 include screen shot trigger controls 192b, which enables user 191 to input a capture command to screen shot application 177 to automatically select a format used to capture a screen shot. Controls 192 enables user 191 to select large format screen shot capture by screen shot application 177 using format selection controls 192c and visual recording controls 192d, as described below with regard to FIGS. 2, 3, 4A-4B, 5A—5B, 6, and 7A—7B.

Data storage subsystem 110 of communication device 101 includes data storage device(s) 193. Controller 105 is communicatively connected, via system interlink 112, to data storage device(s) 193. Data storage subsystem 110 provides program code 174 and computer data 182 stored on non-volatile storage that is accessible by controller 105. For example, data storage subsystem 110 can provide a selection of applications and computer data, such as communication application 175 and other application(s) 178. These applications can be loaded into memory subsystem 106 for execution by controller 105. In one or more embodiments, data storage device(s) 193 can include hard disk drives (HDDs), optical disk drives, and/or solid-state drives (SSDs), etc. Data storage subsystem 110 of communication device 101 can include removable storage device(s) (RSD(s)) 194, which is received in RSD interface 195. Controller 105 is communicatively connected to RSD 194, via system interlink 112 and RSD interface 195. In one or more embodiments, RSD 194 is a non-transitory computer program product or computer readable storage device. Controller 105 can access data storage device(s) 193 or RSD 194 to provision communication device 101 with program code, such as program code for communication application 175, screen shot application 177, and other application(s) 178, and with computer data 182 such as display configurations 183.

According to aspects of the present disclosure, memory subsystem 106 stores communication application 175, which when executed by controller 105, provides electronic page 103 of visual content. In an example, communication application 175 retrieves electronic page 103 via communication subsystem 102 from network storage devices 125. In another example, communication application 175 retrieves electronic page 103 from memory subsystem 106. Controller 105 further executes communication application 175 to present, via the display, at least a portion of electronic page 103. Input device(s) 184 receives an input to capture a screen shot of the display. In response, controller 105 determines a number of screens required to present an entirety of electronic page 103 via display 104. Controller 105 automatically generates a static screen shot image of electronic page 103 in response to the number of screens being equal to or less than a first threshold number of screens (e.g., 1.5 screens or 2 screens). The threshold is used to avoid an illegible result when the screen shot image is subsequently viewed on display 104 or display 104a respectively on communication device 101 or second communication devices 128. A static screen shot may be automatically reduced in size to fit entirely on the corresponding displays 104 and 104a. The threshold may be based in part on the size of display 104 as compared to expected presentation on display 104a that have a different size. In one embodiment, the static screen shot is a raster image file such as in PNG format. The static screen shot image is one image that does not include automation. In an example, pixel settings for one image frame generated in raster frames by display manager 176, for presenting on display 104, are recorded as the static screen shot image. When subsequently presented at a display, such as display 104, the static screen shot image may be sized to fit within dimensions of the display. The static screen shot may be presented without change to resolution, requiring manual panning, scrolling or page flipping by the user to view its entirety. Controller 105 automatically generates a dynamic screen shot image that automatically scrolls or page flips through the entirety of electronic page 103 in response to the number of screens being greater than the first threshold number of screens (e.g., 3 or more screens). The dynamic screen shot image may include a single image or be a composite of more than one image.

In one or more embodiments, input/output subsystem 108 supports additional external input and output devices such as external display 196. In an example, external display 196 may communicatively connect to controller 105 via system interlink 112 such as via a peripheral communication cable and electrical bus connector. In another example, external display 196 may communicatively connect to system interlink 112 and controller 105 via a wired connection or wireless link to communication subsystem 102, as previously described. In one or more embodiments, communication device 101 provides image capturing and communication capabilities and external display 196 provides a larger screen than display 104. Controller 105 provides functionality described herein to capture static and dynamic screen shot images based on display configuration 183 determined for one of display 104 and external display 196 that is being used. In one or more embodiments, controller 105 can modify a stored or received dynamic screen shot image that was generated based on corresponding display configuration 183 of one of display 104 and external display 196 that is subsequently being rendered for presentation on another one of display 104 and external display 196. In an example, external display 196 is an external monitor. In another example, external display 196 is part of a second electronic device, such as a laptop or desktop computer.

Figure 2:
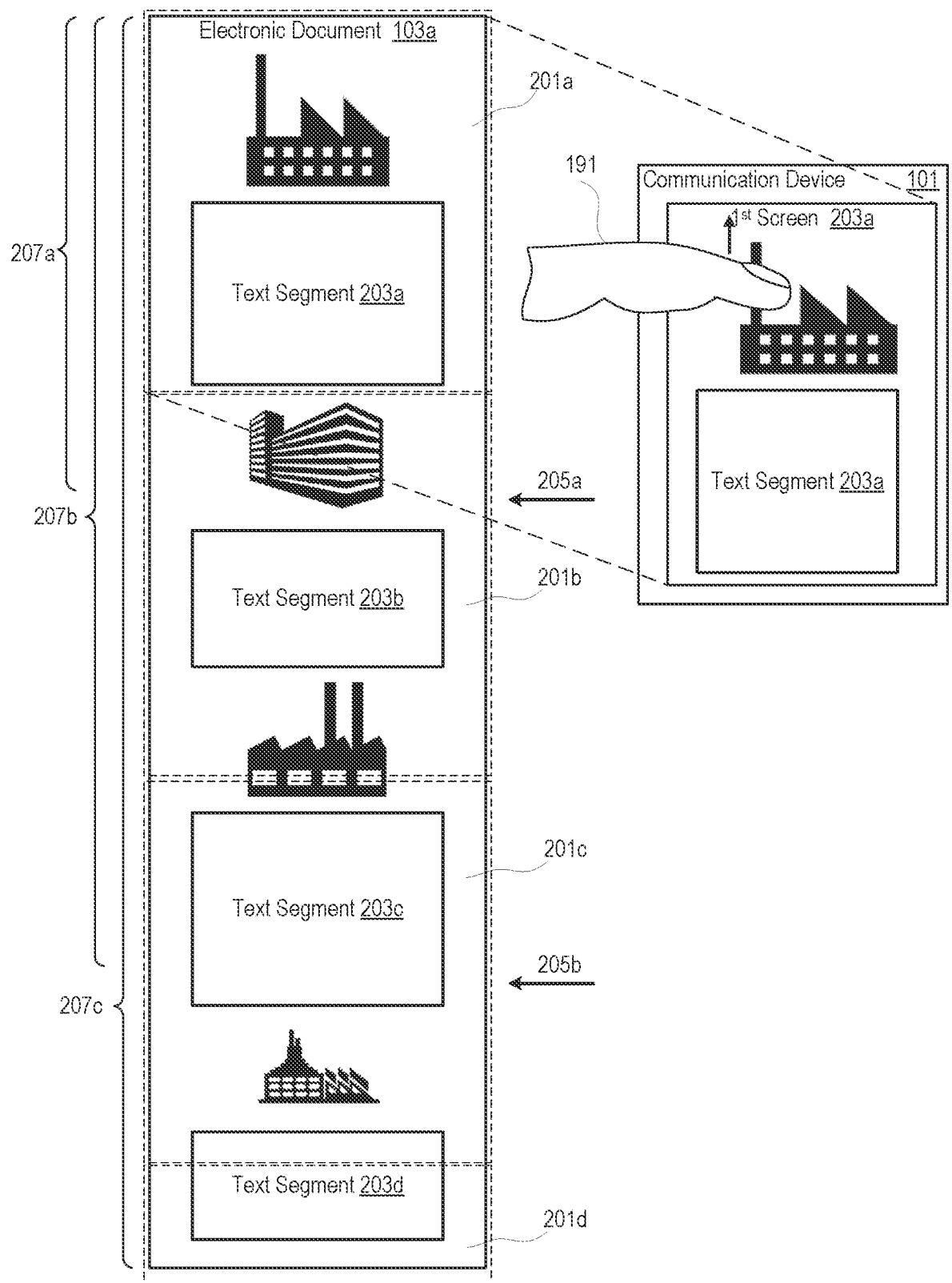
FIG. 2 depicts a front view of the communication device presenting, on a display, one screen of a multi-screen electronic page, according to one or more embodiments.

FIG. 2 depicts a front view of communication device 101 presenting, on display 104, first screen 201a of a multi-screen electronic page 103a. User 191 may interact with communication device 101 to read first text segment 203a on first screen 201a, to scroll to second screen 201b to read second text segment 203b, to scroll to third screen 201c to read third text 203c and scroll to partial fourth screen 201d to read fourth text segment 203d. Each text segment 203a-201d may respectively have different information density requiring a related amount of time to read. Information density may be defined as a number of words per screen or a number of characters per screen. Information density may also include an adjustment based on a complexity of the information in addition to the quantity of information. For example, inclusion of higher order mathematical equations or words that are lengthy or seldom used can be recognized as increasing the information density. User 191 paces scrolling through screens 201a-201d as subjectively required to read or comprehend text segment 203a-201d.

Physical screen sizes and pixel resolution vary greatly across different types of communication devices 101. In addition, the resolution at a particular screen size required to legibly present characters in different fonts, alphabets and languages also varies. A scenario is depicted in FIG. 2 that suggests one physical screen size and one size of electronic page 103. Aspects of the present disclosure can be applied to a range of screen sizes and sizes of electronic pages. In an example, the information density of text segments 203a-201d indicates that first threshold 205a of a number of screens is 1.3 screens, which defines short electronic page size 207a. Second threshold 205b of a number of screens is 2.5 screens, which defines a demarcation between medium electronic page size 207b and large electronic page size 207c. Multi-screen electronic page 103a is larger than second threshold 205b. Multi-screen electronic page 103a falls within dimensions of large electronic page size 207c.

Figure 3:
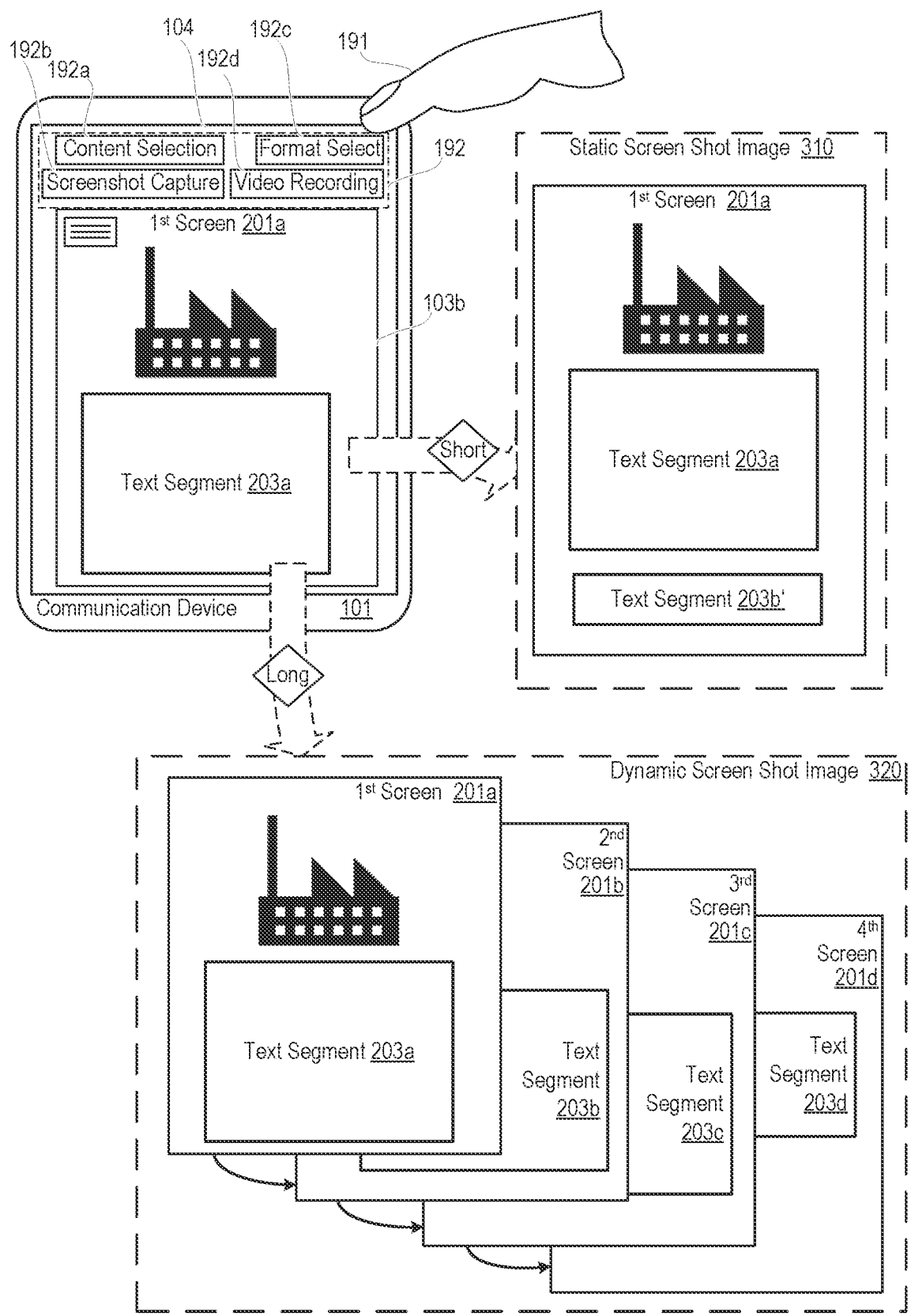
FIG. 3 depicts a front view of the communication device presenting one screen of an electronic page, a static screen shot format for a small electronic page, and a dynamic screen shot format for a large electronic page, according to one or more embodiments.

FIG. 3 depicts a front view of communication device 101 presenting first screen 201a of electronic page 103b that is automatically formatted in one of a static screen shot image 310 (presenting 1.3 screens) and dynamic screen shot image 320 (presenting 4 screens), with the type of screen shot image and associated number of screens provided dependent on the size of electronic page 103b. In addition to automatic static or dynamic format selection, controls 192, presented on display 104 along with first screen 201a, enable user interacting and triggering functionality of dynamic screen shot formatting. Content selection control 192a enables user to select electronic page 103b. Screen shot capture control 192a triggers communication device to capture electronic page 103b automatically formatted as either static screen shot image 310 or dynamic screen shot image 320. In an example, based on determining that electronic page 103b is less than or equal to first threshold 205a (FIG. 2) in size, static screen shot image 310 is generated as a raster image that includes first text segment 203a and partial second text segment 203b'. In an example, a display manager renders content to control pixel elements of display 104 as a raster image that may change frame to frame. Screen shot capture records each pixel setting for an image frame. In another example, based on determining that electronic page 103b is greater than first threshold 205a (FIG. 2) in size, dynamic screen shot image 310 is generated as an animated presentation of screens 201a-201d that respectively includes text segments 203a-203d.

Figure 4A:
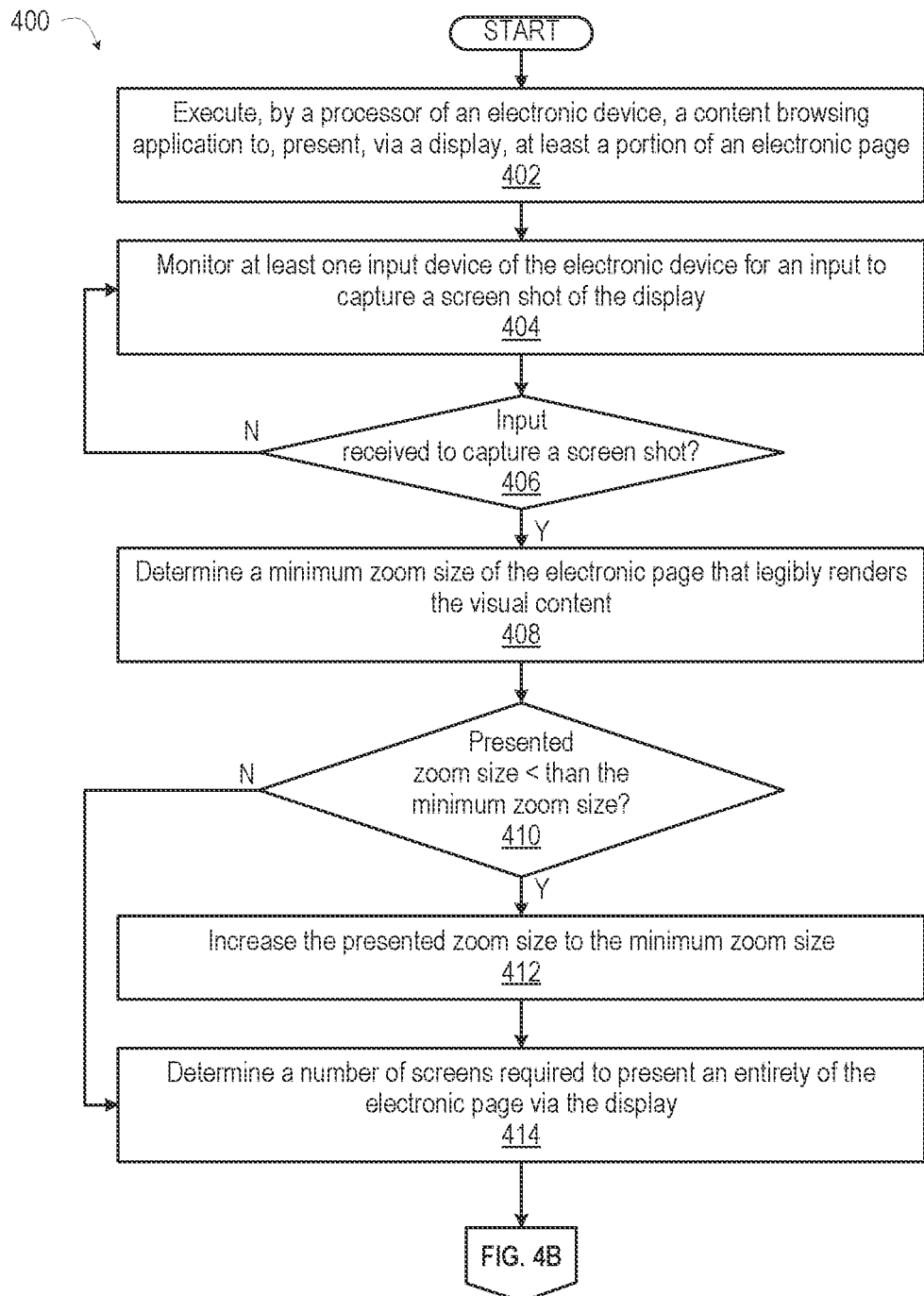
FIGS. 4A-4B (collectively "FIG. 4") are a flow diagram presenting an example method that automates selection of formatting of a screen shot of an electronic device that retains legibility for at least two size ranges of electronic pages, according to one or more embodiments.
Figure 4B:
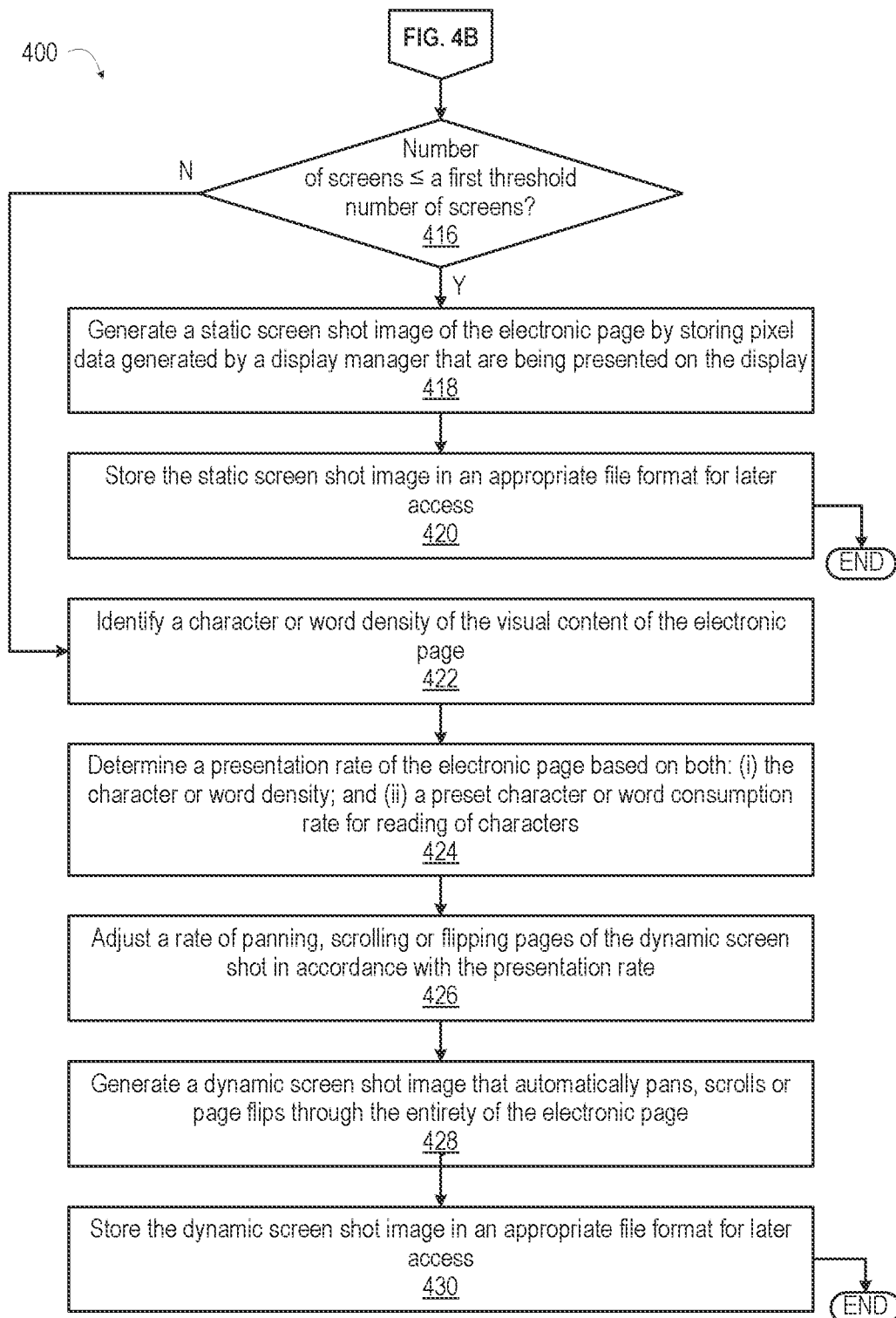
Figure 5A:
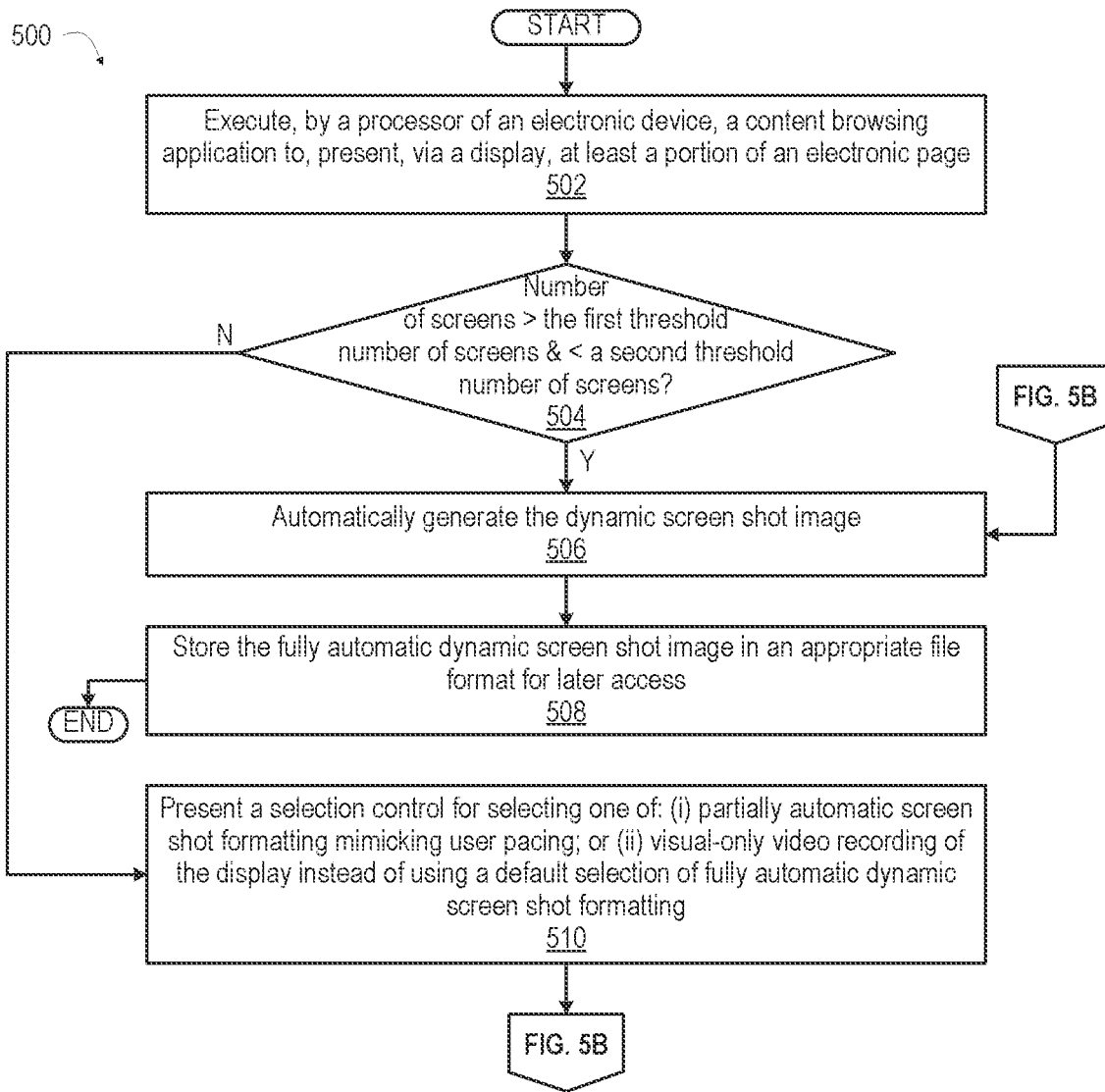
FIGS. 5A-5B (collectively "FIG. 5") are a flow diagram presenting an example method that augments the method of FIGS. 4A-4B with user selectable formatting for large electronic pages, according to one or more embodiments.
Figure 5B:
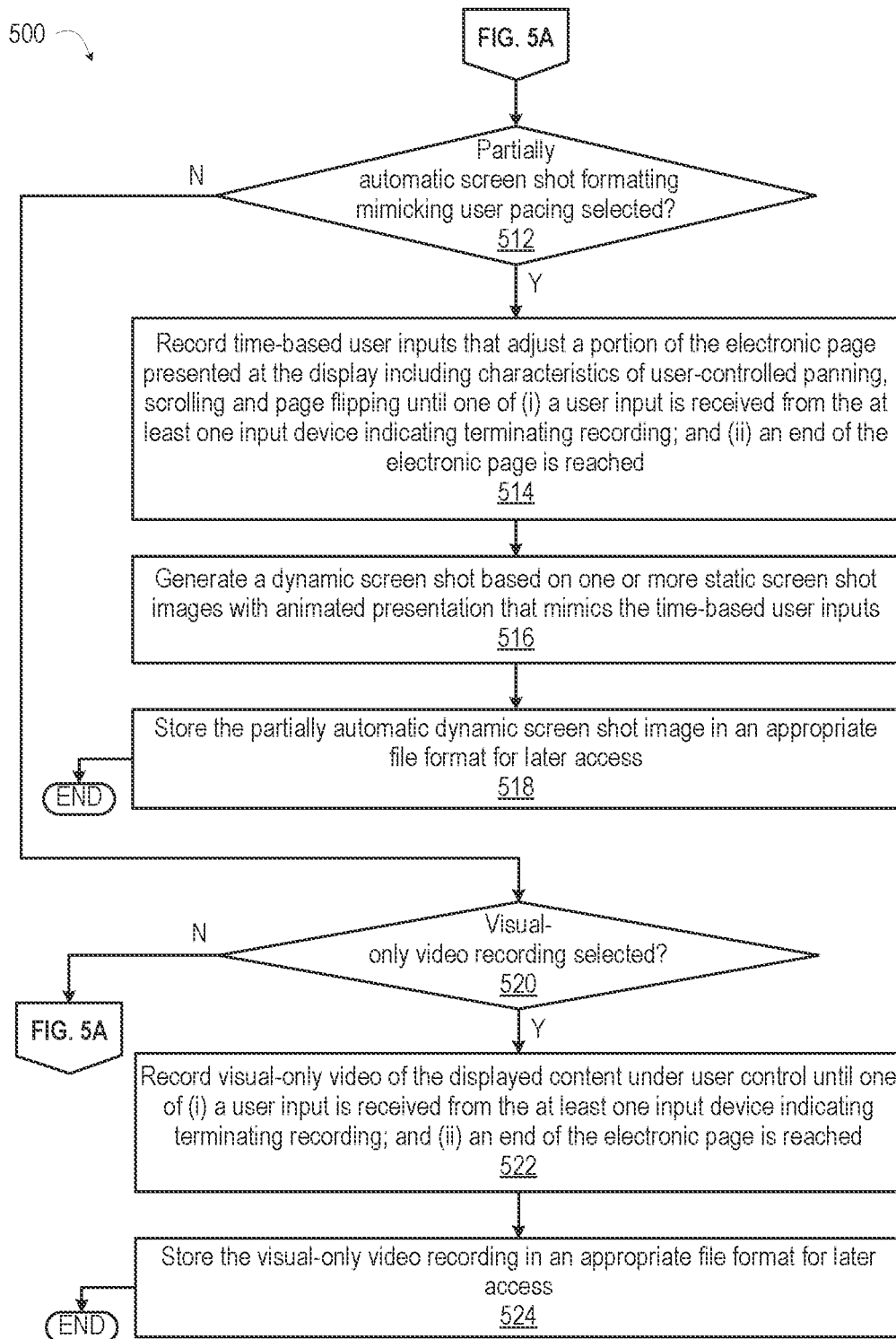

FIGS. 4A-4B (collectively "FIG. 4") are a flow diagram presenting method 400 that automates selection of formatting of a screen shot of an electronic device that retains legibility for at least two size ranges of electronic pages. FIGS. 5A-5B (collectively "FIG. 5") are a flow diagram presenting method 500 that augments the method 400 of FIG. 4 with user selectable formatting for large electronic pages. The descriptions of method 400 (FIG. 4) and method 500 (FIG. 5) are provided with general reference to the specific components illustrated within the preceding FIGS. 1—3. Specific components referenced in method 400 (FIG. 4) and method 500 (FIG. 5) may be identical or similar to components of the same name used in describing preceding FIGS. 1—3. In one or more embodiments, controller 105 (FIG. 1) configures communication device 101 (FIGS. 1-3) to provide the described functionality of method 400 (FIG. 4) and method 500 (FIG. 5).

With reference to FIG. 4A, method 400 includes executing, by a processor of an electronic device, a content browsing application to present, via a display, at least a portion of an electronic page (block 402). Method 400 includes monitoring at least one input device of the electronic device for an input to capture a screen shot of the display (block 404). Method 400 includes determining whether the input is received to capture a screen shot of the display (decision block 406). In response to determining that the input is not received to capture a screen shot, method 400 returns to block 404. In response to determining that the input is received to capture a screen shot, method 400 includes determining a minimum zoom size of the electronic page that legibly renders the visual content (block 408). Method 400 includes determining whether a presented zoom size is less than the minimum zoom size (decision block 410). In response to determining that the presented zoom size is less than the minimum zoom size, method 400 includes increasing the presented zoom size to the minimum zoom size (block 412). In response to determining that the presented zoom size is equal to or greater than the minimum zoom size in decision block 410 or after block 412, method 400 includes determining a number of screens required to present an entirety of the electronic page via the display (block 414). Then method 400 proceeds to block 420 of FIG. 4B.

With reference to FIG. 4B, method 400 includes determining whether the number of screens is equal to or less than a first threshold number of screens (decision block 416). In response to determining that the number of screens is equal to or less than a first threshold number of screens, method 400 includes generating a static screen shot image of the electronic page by storing pixel data generated by a display manager that are being presented on the display (block 418). Method 400 includes storing the static screen shot image in an appropriate file format for later access (block 420). Then method 400 ends. In response to determining that the number of screens is greater than the first threshold number of screens, method 400 includes identifying a character or word density of the visual content of the electronic page (block 422). Method 400 includes determining a presentation rate of the electronic page based on both: (i) the character or word density; and (ii) a preset character or word consumption rate for reading of characters (block 424). Method 400 includes adjusting a rate of panning, scrolling or flipping pages to apply when generating a dynamic screen shot, based on the presentation rate (block 426). Method 400 includes generating a dynamic screen shot image that automatically pans, scrolls or page flips through the sub-pages of content within the entirety of the electronic page (block 428). Method 400 includes storing the dynamic screen shot image in an appropriate file format for later access (block 430). Then method 400 ends.

With reference to FIG. 5A, method 500 includes presenting, via the display, at least a portion of the electronic page that requires the number of screens that is greater than the first threshold number of screens when the screen shot is triggered (block 502). Method 500 includes determining whether the number of screens is greater than the first threshold number of screens but less than a second threshold number of screens that is greater than the first threshold number of screens (i.e., a "medium size" screen shot) (decision block 504). In response to determining that the number of screens is greater than the first threshold number of screens but less than a second threshold number of screens, method 500 includes automatically generating the dynamic screen shot image as a medium size screen shot (block 506). Method 500 includes storing the fully automatic dynamic screen shot image in an appropriate file format for later access (block 508). Then method 500 ends. In response to the number of screens being equal to or greater than the second threshold screen number, method 500 includes presenting a selection control for selecting one of: (i) partially automatic screen shot formatting mimicking user pacing; or (ii) visual-only video recording of the display instead of using a default selection of fully automatic dynamic screen shot formatting (block 510). Then method 500 proceeds to block 512 of FIG. 5B.

With reference to FIG. 5B, method 500 includes determining whether an input is received selecting partially automatic screen shot formatting mimicking user pacing (decision block 512). In response to determining that the input is received selecting partially automatic screen shot formatting mimicking user pacing, method 500 includes recording time-based user inputs that adjust a portion of the electronic page presented at the display including characteristics of user-controlled panning, scrolling and page flipping until one of (i) a user input is received from the at least one input device indicating terminating recording; and (ii) an end of the electronic page is reached (block 514). Method 500 includes generating a dynamic screen shot based on one or more static screen shot images with animated presentation that mimics the time-based user inputs (block 516). Method 500 includes storing the partially automatic dynamic screen shot image in an appropriate file format for later access (block 518). Then method 500 ends.

In response to determining that the input is not received selecting partially automatic screen shot formatting mimicking user pacing, method 500 includes determining whether an input is received selecting visual-only video recording (decision block 520). In response to determining that an input is received selecting visual-only video recording, method 500 includes recording visual-only video of the displayed content under user control until one of (i) a user input is received from the at least one input device indicating terminating recording; and (ii) an end of the electronic page is reached (block 522). Method 500 includes storing the visual-only video recording in an appropriate file format for later access (block 524). Then method 500 ends. In response to determining that an input is not received selecting visual-only video recording in decision block 520, method 500 returns to block 506 (FIG. 5A).

Figure 6A:
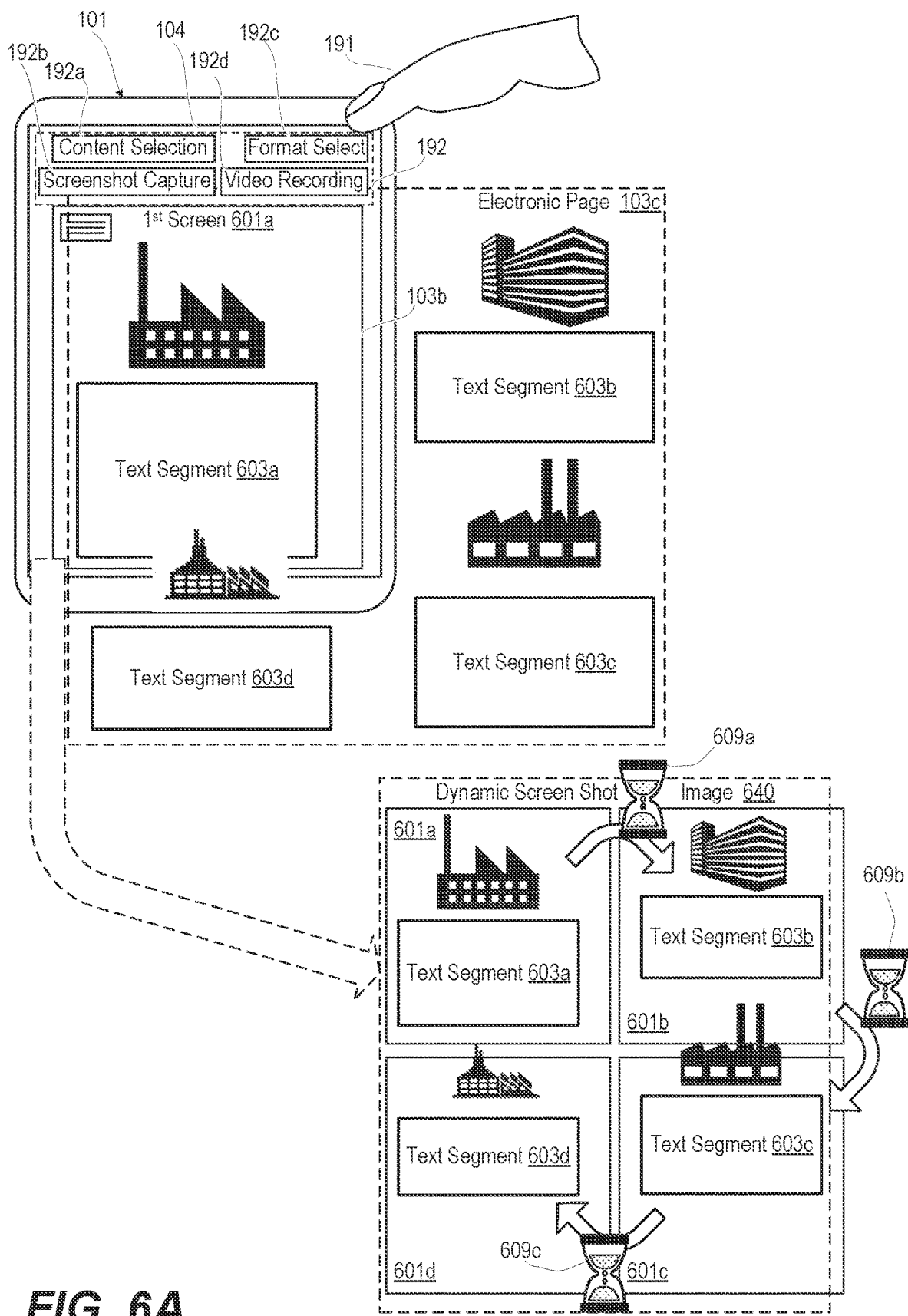
FIG. 6A depicts a front view of a communication device automatically generating a dynamic screen shot image with legibly presented information to capture an entirety of an electronic page that is partially presented on a display, according to one or more embodiments.

FIG. 6A depicts a front view of communication device 101 partially presenting electronic page 103c on first screen 601a. Electronic page 103c requires a two-by-two matrix of screens 601a, 601b, 601c, and 601d to be fully presented in a clockwise manner. In response to receipt of a screen shot command input, communication device 101 automatically captures screens 601a-601d in one or more static screen shot images. Communication device 101 determines information density for respective text segments 603a, 603b, 603c, and 603d for each of screens 601a-601d. Communication device 101 generates dynamic screen shot image 640 that animates presentation of screens 601a-601d with customized time delays 609a, 609b, and 609c according to respective information density in order to legibly present the information (i.e., text segments).

Figure 6B:
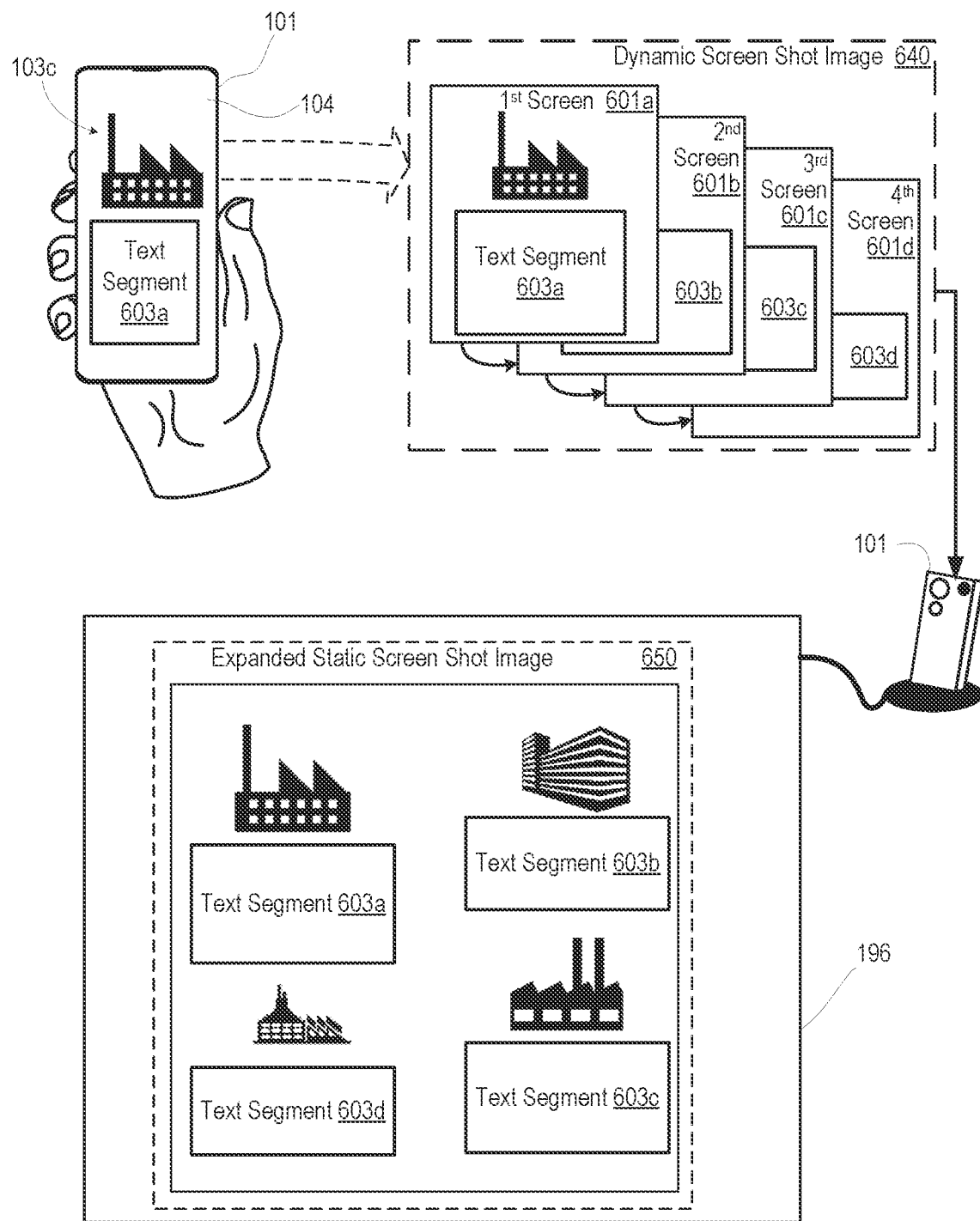
FIG. 6B depicts the dynamic screen shot image generated by the communication device and that is reconstituted as a static screen shot image on a larger external display, according to one or more embodiments.

FIG. 6B depicts dynamic screen shot image 640 that is generated by communication device 101 based on the size of display 104 relative to the electronic document. Subsequently, communication device 101 is communicatively connected to external display 196. In response to a retrieval from memory subsystem 106 or network storage device 125 (FIG. 1) of dynamic screen shot image 640 for presentation on a larger external display, communication device 101 determines, based on a relative larger size of external display 196, that an opportunity exist to reconstitute dynamic screen shot image 640 as expanded static screen shot image 650 that is presented on external display 196.

Figure 7A:
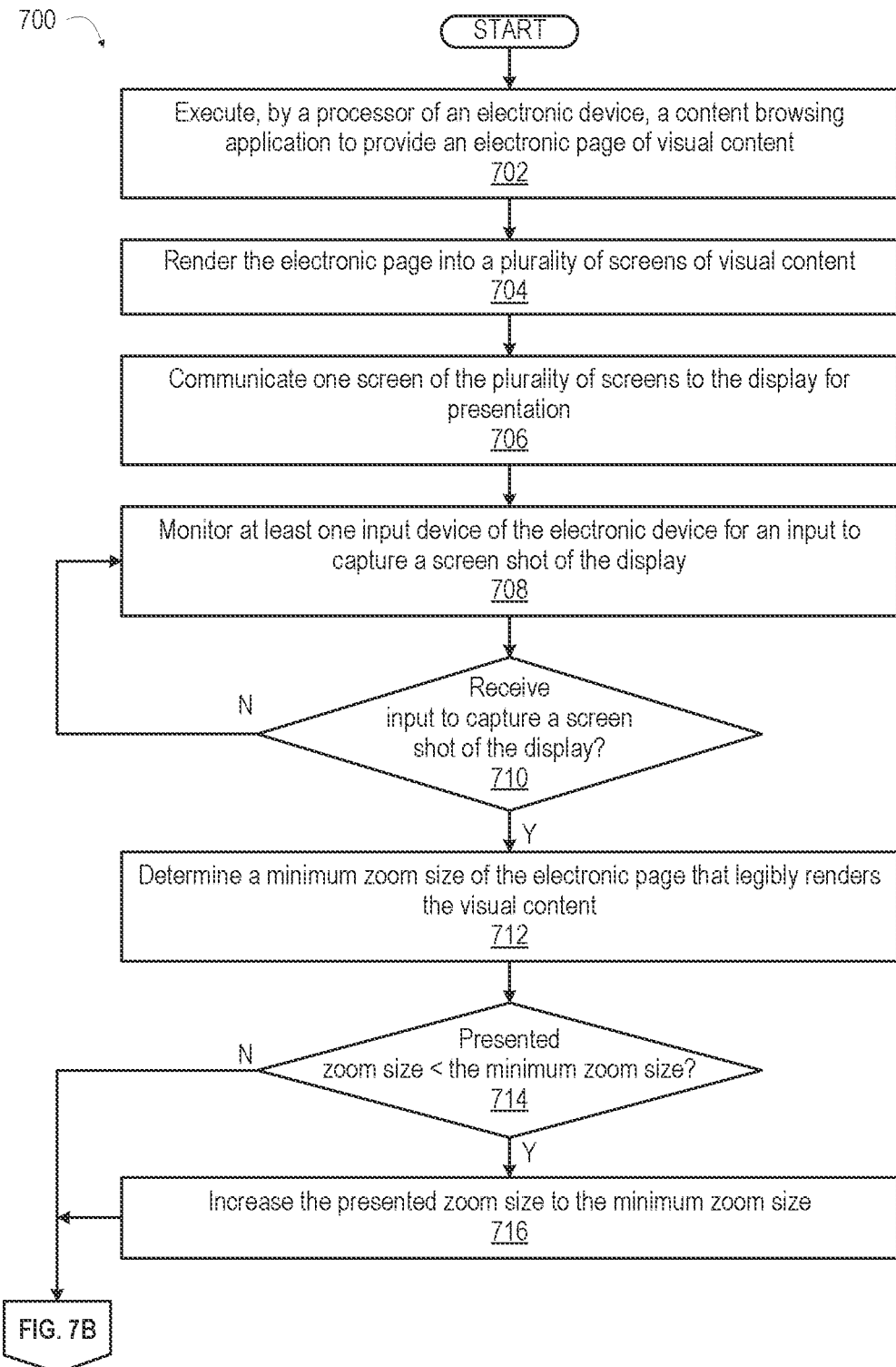
FIGS. 7A-7B (collectively "FIG. 7") are a flow diagram presenting an example method of automatically generating a dynamic screen shot with legibly presented information to capture an entirety of an electronic page that is partially presented on a display of an electronic device, according to one or more embodiments.
Figure 7B:
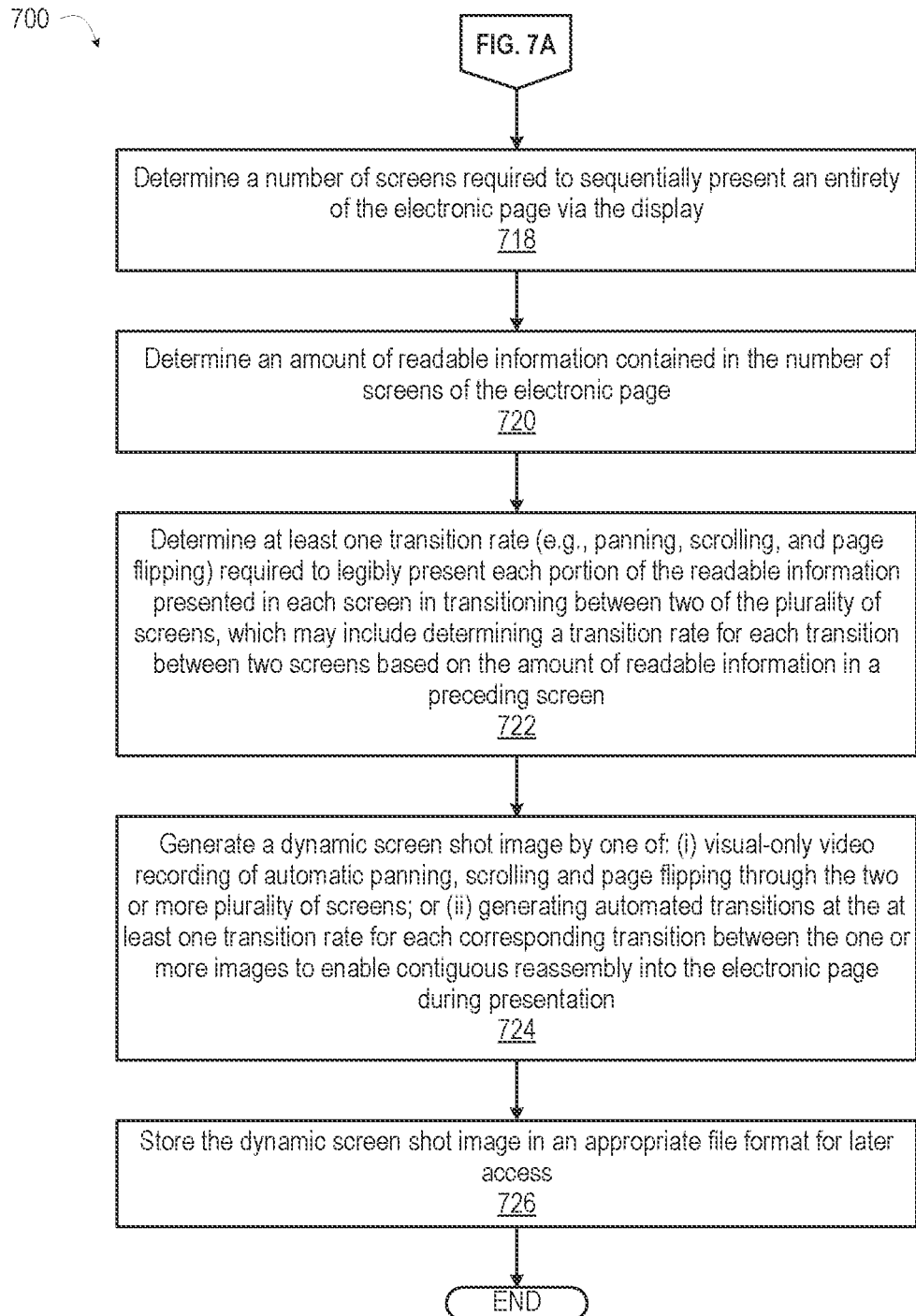
Figure 8:
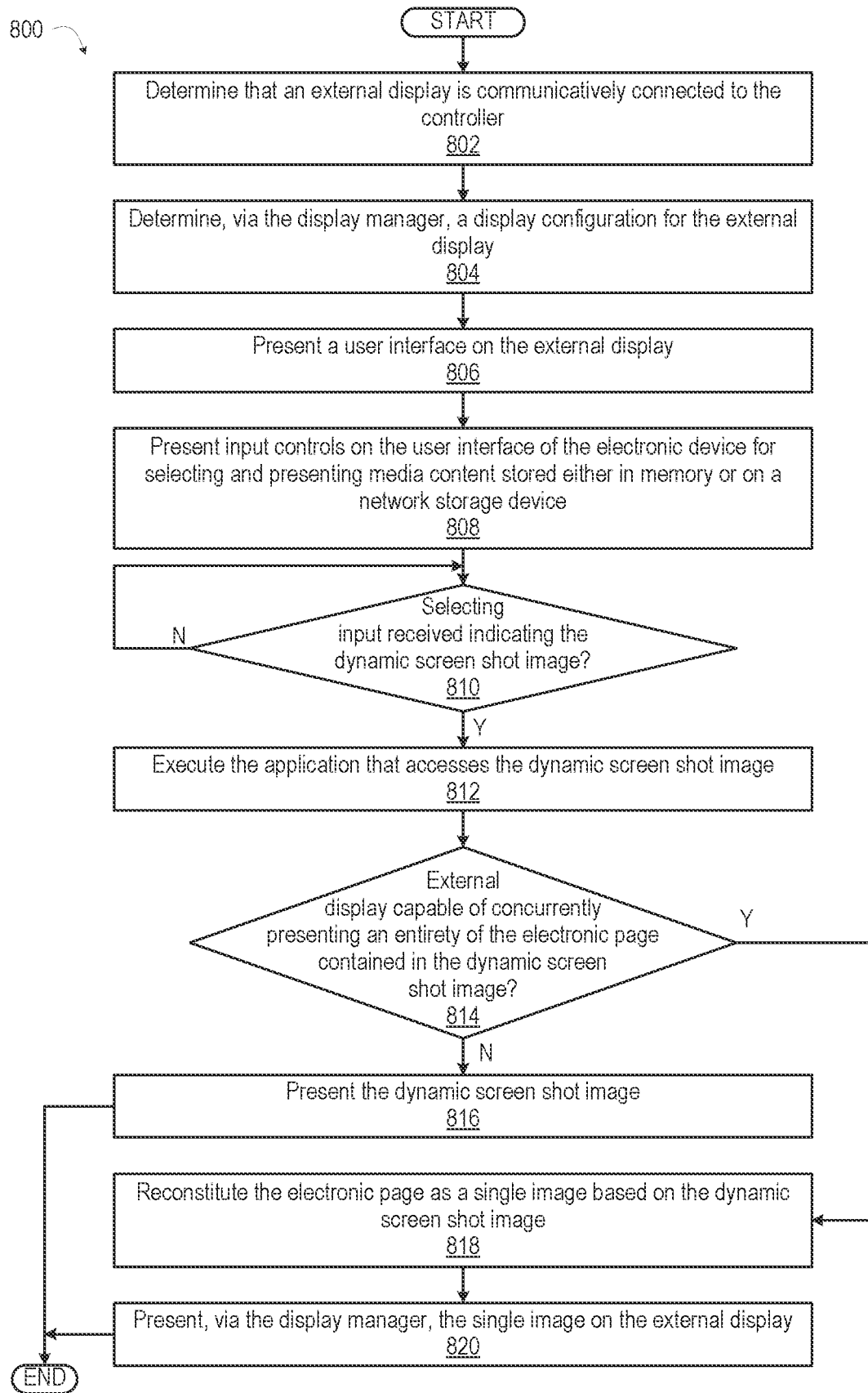
FIG. 8 is a flow diagram presenting an example method of reconstituting a dynamic screen shot image, which was generated for a small display, into a static screen shot image sized for presenting on a larger external monitor, according to one or more embodiments.

FIGS. 7A-7B (collectively "FIG. 7") are a flow diagram presenting an example method of automatically generating a dynamic screen shot with legibly presented information to capture an entirety of an electronic page that is partially presented on a display of an electronic device. FIG. 8 is a flow diagram presenting method 800 of reconstituting a dynamic screen shot image, which was generated for a small display, into a static screen shot image sized for presenting on a larger external display such as a laptop or display monitor. Method 800 adds functionality to method 700 (FIG. 7). The descriptions of method 700 (FIG. 7) and method 800 (FIG. 8) are provided with general reference to the specific components illustrated within the preceding FIGS. 1— 3 and 6A-6B. Specific components referenced in method 700 (FIG. 7) may be identical or similar to components of the same name used in describing preceding FIGS. 1—3 and 6A-6B. In one or more embodiments, controller 105 (FIG. 1) configures communication device 101 (FIGS. 1—3 and 6A-6B) to provide the described functionality of method 700 (FIG. 7).

With reference to FIG. 7A, method 700 includes executing, by a processor of an electronic device, a content browsing application to provide an electronic page of visual content (block 702). Method 700 includes rendering the electronic page into a plurality of screens of visual content (block 704). Method 700 includes communicating one screen of the plurality of screens to the display for presentation (block 706). Method 700 includes monitoring at least one input device of the electronic device for an input to capture a screen shot of the display (block 708). Method 700 includes determining whether the input is received to capture a screen shot of the display (decision block 710). In response to determining that the input is not received to capture a screen shot, method 700 returns to block 708. In response to determining that the input is received to capture a screen shot, method 700 includes determining a minimum zoom size of the electronic page that legibly renders the visual content (block 712). Method 700 includes determining whether a presented zoom size is less than the minimum zoom size (decision block 714). In response to determining that the presented zoom size is less than the minimum zoom size, method 700 includes increasing the presented zoom size to the minimum zoom size (block 716). In response to determining that the presented zoom size is equal to or greater than the minimum zoom size in decision block 714 or after block 716, method 700 proceeds to block 718 of FIG. 7B.

With reference to FIG. 7B, method 700 includes determining a number of screens required to sequentially present an entirety of the electronic page via the display (block 718). According to one embodiment, the number of screens may include a two-dimensional array presenting a first number of horizontal screens and a second number of vertical screens. Method 700 includes determining an amount of readable information contained in the number of screens of the electronic page (block 720). In one embodiment, the determining may include determining the amount of readable information in each screen. Method 700 includes determining at least one transition rate (e.g., panning, scrolling, and page flipping) required to legibly present each portion of the readable information presented in each screen in transitioning between two of the plurality of screens (block 722). According to one or more embodiments, the determining of the at least one transition rate may include determining a transition rate for each transition between two screens, based on the amount of readable information in a preceding screen. Method 700 includes generating a dynamic screen shot image by one of: (i) recording visual-only video of the display of automatic panning, scrolling and page flipping through the two or more screens of the plurality of screens; or (ii) generating automated transitions at the at least one transition rate for each corresponding transition between the one or more images to enable contiguous reassembly into the electronic page during presentation (block 724). Method includes storing the dynamic screen shot image in an appropriate file format for later access (block 726). Then method 700 ends.

With reference to FIG. 8, method 800 includes determining that an external display is communicatively connected to the controller (block 802). Method 800 includes determining, via the display manager, a display configuration for the external display (block 804). Method 800 includes presenting a user interface on the external display (block 806). Method 800 includes presenting input controls on the user interface of the electronic device for selecting and presenting media content stored either in memory or on a network storage device (block 808). Method 800 includes determining whether a selecting input is received by at least one input device indicating selection of a dynamic screen shot image for presenting on the display (decision block 810). In response to determining that the selecting input is not received, method 800 returns to decision block 810. In response to determining that the selecting input is received for presenting the dynamic screen shot image, method 800 includes executing the application that accesses the dynamic screen shot image (block 812). Method 800 includes determining, via the display manager, whether the external display is capable of concurrently presenting an entirety of the electronic page contained in the dynamic screen shot image (decision block 814). In response to determining that the external display is not capable of concurrently presenting the entirety of the electronic page, method 800 includes presenting the dynamic screen shot image as a sequence of partial pages (block 816). Then method 800 ends. In response to determining that the external display is capable of concurrently presenting the entirety of the electronic page, method 800 includes reconstituting the electronic page as a single image based on the dynamic screen shot image (block 818). Method 800 includes presenting, via the display manager, the single image on the external display (block 820). Then method 800 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   a display;
   at least one input device;
   a memory storing an application that provides an electronic page of visual content; and
   a controller communicatively connected to the display, the at least one input device, and the memory, and which:
      executes the application to present, via the display, at least a portion of the electronic page; and
      in response to receiving an input, via the at least one input device, to capture a screen shot of the display:
         determines a number of screens required to present an entirety of the electronic page via the display;
         in response to the number of screens being equal to or less than a first threshold number of screens, generates a static screen shot image of the electronic page; and
         in response to the number of screens being greater than the first threshold number of screens, generates a dynamic screen shot image that automatically scrolls or page flips through the entirety of the electronic page.

2. The electronic device of claim 1, wherein the controller:
   determines a minimum zoom size of the electronic page that legibly renders the visual content; and
   prior to determining the number of screens required and in response to identifying that a presented zoom size is less than the minimum zoom size, increases zoom size of the electronic page for screen capture to the minimum zoom size.

3. The electronic device of claim 1, wherein the controller:
   identifies a character word density of the visual content of the electronic page;
   determines a presentation rate of the electronic page based on both: (i) the character density; and (ii) a preset character consumption rate for reading of characters; and
   adjusts a rate of scrolling or flipping pages of the dynamic screen shot in accordance with the presentation rate.

4. The electronic device of claim 1, wherein the controller:
   identifies a word density of the visual content of the electronic page;
   determines a presentation rate of the electronic page based on both: (i) the word density; and (ii) a preset word consumption rate for reading of words; and
   adjusts a rate of scrolling or flipping pages of the dynamic screen shot in accordance with the presentation rate.

5. The electronic device of claim 1, wherein the controller:
   in response to the number of screens being greater than the first threshold number of screens but less than a second threshold number of screens that is greater than the first threshold number of screens, automatically generates the dynamic screen shot; and
   in response to the number of screens being equal to or greater than the second threshold screen number:
      presents a selection control for selecting one of: (i) generating the dynamic screen shot; or (ii) visual-only recording, of the display;
      in response to receiving a selection input indicating selection of dynamic screen shot, performs the automatic dynamic screen shot; and
      in response to receiving a selection input indicating selection of visual-only recording, records the display.

6. The electronic device of claim 5, wherein, in recording the display, the controller:
   records time-based user inputs that adjust a portion of the electronic page presented at the display; and
   generates a dynamic screen shot based on a static screen shot with animated presentation that mimics the time-based user inputs.

7. The electronic device of claim 5, wherein, in recording the display, the controller records visual-only video of the display.

8. The electronic device of claim 5, wherein the controller terminates recording of the display in response to receiving a user input indicating termination from the at least one input device.

9. The electronic device of claim 5, wherein the controller terminates recording of the display in response to determining that an entirety of the electronic page is presented.

10. A method comprising:
    executing, by a processor of an electronic device, an application to present, via a display, at least a portion of an electronic page; and
    in response to receiving an input, via at least one input device of the electronic device, to capture a screen shot of the display:
       determining a number of screens required to present an entirety of the electronic page via the display;
       in response to the number of screens being equal to or less than a first threshold number of screens, generating a static screen shot image of the electronic page; and
       in response to the number of screens being greater than the first threshold number of screens, generating a dynamic screen shot image that automatically scrolls or page flips through the entirety of the electronic page.

11. The method of claim 10, further comprising:
determining a minimum zoom size of the electronic page that legibly renders visual content that is contained in the electronic page; and
prior to determining the number of screens required and in response to identifying that a presented zoom size is less than the minimum zoom size, increasing zoom size of the electronic page for screen capture to the minimum zoom size.

12. The method of claim 10, further comprising:
identifying a character word density of visual content of the electronic page;
determining a presentation rate of the electronic page based on both: (i) the character density; and (ii) a preset character consumption rate for reading of characters; and
adjusting a rate of scrolling or flipping pages of the dynamic screen shot in accordance with the presentation rate.

13. The method of claim 10, further comprising:
identifying a word density of visual content of the electronic page;
determining a presentation rate of the electronic page based on both: (i) the word density; and (ii) a preset word consumption rate for reading of words; and
adjusting a rate of scrolling or flipping pages of the dynamic screen shot in accordance with the presentation rate.

14. The method of claim 10, further comprising:
in response to the number of screens being greater than the first threshold number of screens but less than a second threshold number of screens that is greater than the first threshold number of screens, automatically generating the dynamic screen shot; and
in response to the number of screens being equal to or greater than the second threshold screen number:
presenting a selection control for selecting one of: (i) generating the dynamic screen shot; or (ii) visual-only recording, of the display;
in response to receiving a selection input indicating selection of dynamic screen shot, performing the automatic dynamic screen shot; and
in response to receiving a selection input indicating selection of visual-only recording, recording the display.

15. The method of claim 14, wherein recording the display further comprises:
recording time-based user inputs that adjust a portion of the electronic page presented at the display; and
generating a dynamic screen shot based on a static screen shot with animated presentation that mimics the time-based user inputs.

16. The method of claim 14, wherein recording the display further comprises visual-only video recording the display.

17. The method of claim 14, further comprising terminating recording of the display in response to receiving a user input indicating termination from the at least one input device.

18. The method of claim 14, further comprising terminating recording of the display in response to determining that an entirety of the electronic page is presented.

19. A computer program product comprising:
a computer readable storage device; and
program code on the computer readable storage device that when executed by a processor associated with an electronic device, the program code enables the electronic device to provide functionality of:
executing, by a processor of an electronic device, an application to present, via a display, at least a portion of an electronic page; and
in response to receiving an input, via at least one input device of the electronic device, to capture a screen shot of the display:
determining a number of screens required to present an entirety of the electronic page via the display;
in response to the number of screens being equal to or less than a first threshold number of screens, generating a static screen shot image of the electronic page; and
in response to the number of screens being greater than the first threshold number of screens, generating a dynamic screen shot image that automatically scrolls or page flips through the entirety of the electronic page.

20. The computer program product of claim 19, wherein the program code enables the electronic device to provide functionality of:
determining a minimum zoom size of the electronic page that legibly renders visual content that is contained in the electronic page; and
prior to determining the number of screens required and in response to identifying that a presented zoom size is less than the minimum zoom size, increasing zoom size of the electronic page for screen capture to the minimum zoom size.

* * * * *